(12) United States Patent
Defontaine et al.

(10) Patent No.: US 11,661,976 B2
(45) Date of Patent: May 30, 2023

(54) PROGRESSIVITY DEVICE FOR A FRICTION CLUTCH DISC, AND FRICTION CLUTCH DISC INCORPORATING SUCH A DEVICE

(71) Applicant: VALEO EMBRAYAGES, Amiens (FR)

(72) Inventors: Remy Defontaine, Cergy Pontoise (FR); Pascal Dast, Cergy Pontoise (FR)

(73) Assignee: VALEO EMBRAYAGES, Amiens (FR)

( * ) Notice: Subject to any disclaimer, the term of this patent is extended or adjusted under 35 U.S.C. 154(b) by 37 days.

(21) Appl. No.: 17/126,613

(22) Filed: Dec. 18, 2020

(65) Prior Publication Data

US 2021/0190151 A1 Jun. 24, 2021

(30) Foreign Application Priority Data

Dec. 19, 2019 (FR) ...................................... 19 14976

(51) Int. Cl.
*F16D 13/64* (2006.01)
*F16D 13/38* (2006.01)

(52) U.S. Cl.
CPC ............. *F16D 13/64* (2013.01); *F16D 13/38* (2013.01); *F16D 2013/642* (2013.01); *F16D 2300/22* (2013.01)

(58) Field of Classification Search
CPC ........................... F16D 2013/642; F16D 13/64
See application file for complete search history.

(56) References Cited

U.S. PATENT DOCUMENTS

| 10,215,236 B2 * | 2/2019 | Malley .................... F16D 13/64 |
| 2017/0023071 A1 * | 1/2017 | Basiewicz ............... F16D 13/64 |
| 2017/0321762 A1 * | 11/2017 | Büdicker ................ F16D 13/68 |

FOREIGN PATENT DOCUMENTS

| DE | 4319150 A1 * | 12/1993 | ............. F16D 13/64 |
| FR | 3059066 A1 * | 5/2018 | ............. F16D 13/64 |

* cited by examiner

*Primary Examiner* — Richard W Ridley
*Assistant Examiner* — Aimee Tran Nguyen
(74) *Attorney, Agent, or Firm* — Oblon, McClelland, Maier & Neustadt, L.L.P.

(57) ABSTRACT

A progressivity device for a friction clutch disc includes a support flange, having a central axis of rotation, in which an annular central part is designed to cooperate with a torsional vibration damper, and an external part bears progressivity blades and friction pads attached to the progressivity blades. The progressivity blades extend circumferentially over at least one of the faces of the support flange. The progressivity blade include one end fixed to the external part, another free end and folds delimiting a support region for the friction pad.

16 Claims, 8 Drawing Sheets

PROGRESSIVITY DEVICE FOR A FRICTION CLUTCH DISC, AND FRICTION CLUTCH DISC INCORPORATING SUCH A DEVICE

The present invention relates to a progressivity device for a friction clutch disc for a motor vehicle. The motor vehicle can be what is known as an industrial vehicle, the latter being for example a heavy-duty vehicle, a public transport vehicle, or an agricultural vehicle.

More precisely, the invention relates to an improvement to the clutches of the type comprising a friction clutch disc mounted on the input shaft of the gearbox and bearing on an engine flywheel in the clutched position. A clutch mechanism fixed to the engine flywheel, otherwise referred to as an inertia flywheel, applies a clamping force to the clutch disc in order to transmit the torque produced by the engine.

Friction clutch discs conventionally comprise friction pads in the form of segments fixed to a support, itself attached to a torque transmission flange. The friction pads are generally of the metal-ceramic type.

Two guide washers arranged on either side of the flange are mounted on a central hub secured to the driven shaft of the gearbox. Helical compression springs are arranged circumferentially between the guide washers and the torque transmission flange. The transmission of the torque and the filtering of the engine acyclisms is achieved by successive compression and relaxation of the springs.

During the clutch re-engagement phase, the transmission of the torque must be as progressive as possible. The clutch mechanism then applies an increasing axial compression force to the progressivity device until the engine torque has been completely transmitted.

Progressivity devices already exist which comprise friction pads in the form of segments such as that described, in particular, in Patent Application EP3036451A1.

That document discloses a friction clutch disc comprising in particular a torsional vibration damper and a progressivity device. The progressivity device is formed by friction pads in the form of segments fixed to progressivity blades which are linked in pairs, each of the progressivity blades being attached to the periphery of a torque transmission flange.

The progressivity of the device is ensured by the axial stack of two blades, one serving as a support and the other having a fold which deforms radially when the clutch mechanism is closed. The two friction faces of the friction clutch disc are fragmented. Depending on the number of pads fixed to the torque transmission flange, the wear of the friction faces can be rapid and harm the general durability of the friction clutch disc. This fragmented friction face configuration is therefore not satisfactory.

Likewise, during the clutch re-engagement phase, the friction pads in the form of segments are highly stressed and tend to deform in an uncontrolled manner, then creating discontinuities in the transmission of the torque that are accompanied by a phenomenon known as chatter with extremely uncomfortable jerks that are detrimental to the driving of the vehicle.

The disadvantages associated with this progressivity device are linked with the restricted number of friction pads and with the absence of means for retaining the progressivity blades during the clutch-release phases. In this phase, the clutch mechanism no longer applies a load to the friction pads. The end of the progressivity blade deforms in an uncontrolled manner, thus generating geometric defects. Vehicle comfort during the clutch re-engagement phases is therefore degraded.

The number of folds available on the progressivity blades is also limited such that the progressivity device possesses high overall stiffness. Vehicle comfort is also degraded.

The invention aims to overcome these technical problems by proposing an improved progressivity device with progressivity blades, the deformation of which is controlled by removing, or at the very least by greatly limiting, the out-of-parallelism risks of the friction pads during the clutch re-engagement phases.

To this end, the invention proposes a progressivity device for a friction clutch disc, comprising:

a support flange, having a central axis of rotation X, in which an annular central part is designed to cooperate with a torsional vibration damper, and an external part carries progressivity blades and friction pads attached to the progressivity blades, wherein the progressivity blades extend circumferentially over at least one of the faces of the support flange, the progressivity device being noteworthy in that each progressivity blade comprises one end fixed to the external part, another free end and folds delimiting a support region for the friction pad, the friction pad associated with this progressivity blade covering the end fixed to the support flange.

This progressivity device, according to the invention, has the advantage, by virtue of the end fixed to the support flange being covered by the friction pad, of increasing the surface of the friction faces of the friction clutch disc and therefore of improving the durability thereof. Moving the friction pads closer together also makes it possible to increase the number of folds on the progressivity blades and therefore to increase vehicle comfort during the clutch re-engagement phase.

Advantageously, the support region of each progressivity blade can be offset axially with respect to the fixed end, the fixed end of said progressivity blade bearing on the face of the support flange. In this way, the support region for the friction pads is arranged as close as possible to the fixing region of the progressivity blades, and the geometric defects in the friction face of the pads are reduced. Preferably, the support region is planar.

The invention may have one or other of the features described below, in combination with one another or considered independently of one another:

the friction pad can have an angular segment shape;
the friction pad can be attached directly to the support region;
the friction pad can be formed from metal-ceramic material, or from frit, or from organic material;
the number of friction pads per friction face can be between 3 and 15;
the friction pads can be fixed by assembly rivets or by welding to the progressivity blades;
the friction pad can be adhesively bonded onto an intercalary foil;
the support region can comprise orifices able to accommodate assembly rivets for assembling the friction pads on the progressivity blades;
the support region can be delimited by two parallel folds;
the folds of one and the same progressivity blade can be parallel to one another and have the same axial stiffness;
the folds can have the same width and the same height and extend symmetrically on either side of the diametral axis of the support flange;
the support flange can have notches in the angular sectors situated below the support region of the progressivity blades such that the inertia of the progressivity device is improved;

the progressivity blade can be produced from steel sheet, the folds being perpendicular to the rolling direction of the sheet;

the progressivity blade can comprise at least two material folds delimiting the support region for the friction pad, the folds extending in an orthoradial direction with respect to the central axis of the support flange such that, under bearing stresses, the folds are squashed in an isostatic manner;

the fixed end of the progressivity blade can be retained on the support flange by two rivets distributed along the material fold situated between the fixed end and the support region for the friction pad;

the progressivity blade can comprise at least two material folds delimiting the support region for the friction pad, the material fold situated between the fixed end and the support region for the friction pad being able to extend along a substantially radial direction, the other material folds of the progressivity blade being distributed circumferentially beyond the support region and away from the fixed end.

According to one variant of the invention, friction pads can be fixed directly to one of the faces of the support flange, opposite progressivity blades arranged on the other face. This variant of the invention has the advantage of having the progressivity on the side of the friction clutch disc in contact with the clutch mechanism.

According to another variant of the invention, the progressivity blades can extend circumferentially over the two faces of the support flange, the progressivity blades being arranged axially facing one another, on either side of the external part. This other variant of the invention has the advantage of improving the mechanical strength and of decreasing the overall stiffness of the progressivity device, given that the number of folds is increased.

The invention also relates, according to another of its aspects, to a progressivity device taking all or some of the aforementioned features and in which the support flange comprises a retaining means passing through the free end of each progressivity blade.

This progressivity device, according to this aspect of the invention, has the advantage, by virtue of the retaining means arranged on the support flange, of reducing the geometric defects in the friction face of the pads.

Advantageously, the free end of each progressivity blade can be retained axially with respect to the support flange by way of the retaining means when the progressivity device is freed from all axial compression force. In this way, the geometric defects in the friction face of the pads are reduced, thus contributing to improving vehicle comfort during the clutch re-engagement phase.

Preferably, the retaining means can comprise at least one rivet, having a shouldered head, fixed to the support flange and introduced into an orifice formed in the free end of each progressivity blade, part of the free end being able to bear on the shouldered head of the rivet.

Alternatively, the retaining means can comprise a folded tab materially integral with the support flange and introduced into an orifice formed in the free end of each progressivity blade, part of the free end being able to bear on the folded tab.

The invention also relates, according to another of its aspects, to a progressivity device taking all or some of the aforementioned features and in which the free end of each progressivity blade can be retained at least partially axially with respect to the support flange by way of the fixed end of the adjacent progressivity blade when the progressivity device is freed from all axial compression force.

This progressivity device, according to this aspect of the invention, has the advantage, by virtue of the retention of the free end of the progressivity blade, of reducing the geometric defects in the friction face of the pads.

Advantageously, part of the free end of each progressivity blade can be inserted into a disengagement hole formed in the support flange and covered at least partially by the fixed end of the adjacent progressivity blade, thus contributing to reducing the axial bulk of the progressivity device.

The invention also relates, according to another of its aspects, to a progressivity device taking all or some of the aforementioned features and in which each friction pad bears axially against the circumferentially adjacent friction pad.

This progressivity device, according to this aspect of the invention, has the advantage, by virtue of bringing the friction pads into mutual bearing engagement, of reducing the geometric defects in the friction face of the pads. The total surface area of the progressivity blades is now dedicated to the formation of fold regions which can be optimized in terms of mechanical strength.

Advantageously, each friction pad can comprise an intercalary foil, the intercalary foil bearing axially on the intercalary foil of the adjacent friction pad when the progressivity device is freed from all axial compression force.

Preferably, the intercalary foil can comprise a bearing tongue oriented angularly in the direction of the free end of each progressivity blade, said bearing tongue bearing directly on the intercalary foil of the adjacent friction pad.

Advantageously, the bearing tongue is obtained by folding and/or stamping the intercalary foil.

Alternatively, each friction pad can comprise an intercalary foil, two circumferentially adjacent intercalary foils being connected to one another by a mortise and tenon connection and bearing axially on one another by way of at least one additional rivet.

According to this alternative, the intercalary foil associated with the friction pad having an angular segment shape can have an asymmetrical profile at the lateral faces. On one of the lateral faces, the intercalary foil can have a protuberance forming the tenon and, on the other lateral face, the intercalary foil can have a cavity forming the mortise.

The invention also relates, according to another of its aspects, to a friction clutch disc for a motor vehicle, comprising a torque transmission flange, two guide washers placed on either side of said torque transmission flange, helical compression springs bearing on the torque transmission flange and the guide washers, and a progressivity device taking all or some of the aforementioned features, wherein the support flange is borne either by the torque transmission flange or by one of the two guide washers.

The support flange can comprise notches or windows surrounding the helical compression springs.

The support flange can comprise notches cut into the outer periphery of the external part.

The invention will be better understood on reading the following description, which is provided purely by way of example and with reference to the appended drawings, in which.

Hereinafter in the description and the claims, by way of non-limiting example and in order to facilitate understanding thereof, the terms "front" or "rear" will be used according to the direction relative to an axial orientation determined by the main axis of rotation O of the transmission of the motor vehicle, and the terms "inner/internal" or "outer/external" will be used relative to the axis O and according to a radial orientation which is orthogonal to said axial orientation.

Figure 1:
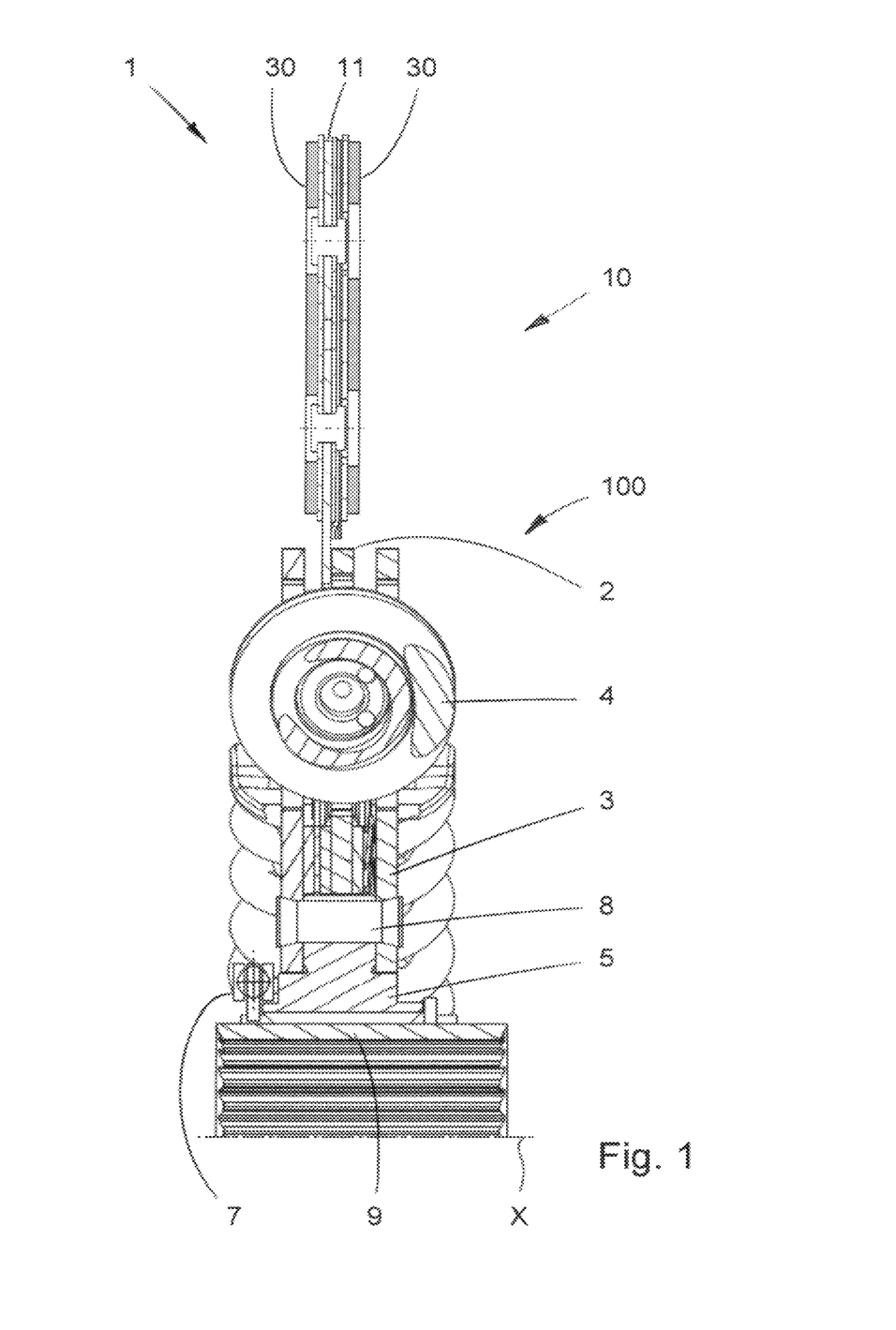
FIG. 1 is a sectional view of a friction clutch disc incorporating a progressivity device according to a first embodiment of the invention.
Figure 2:
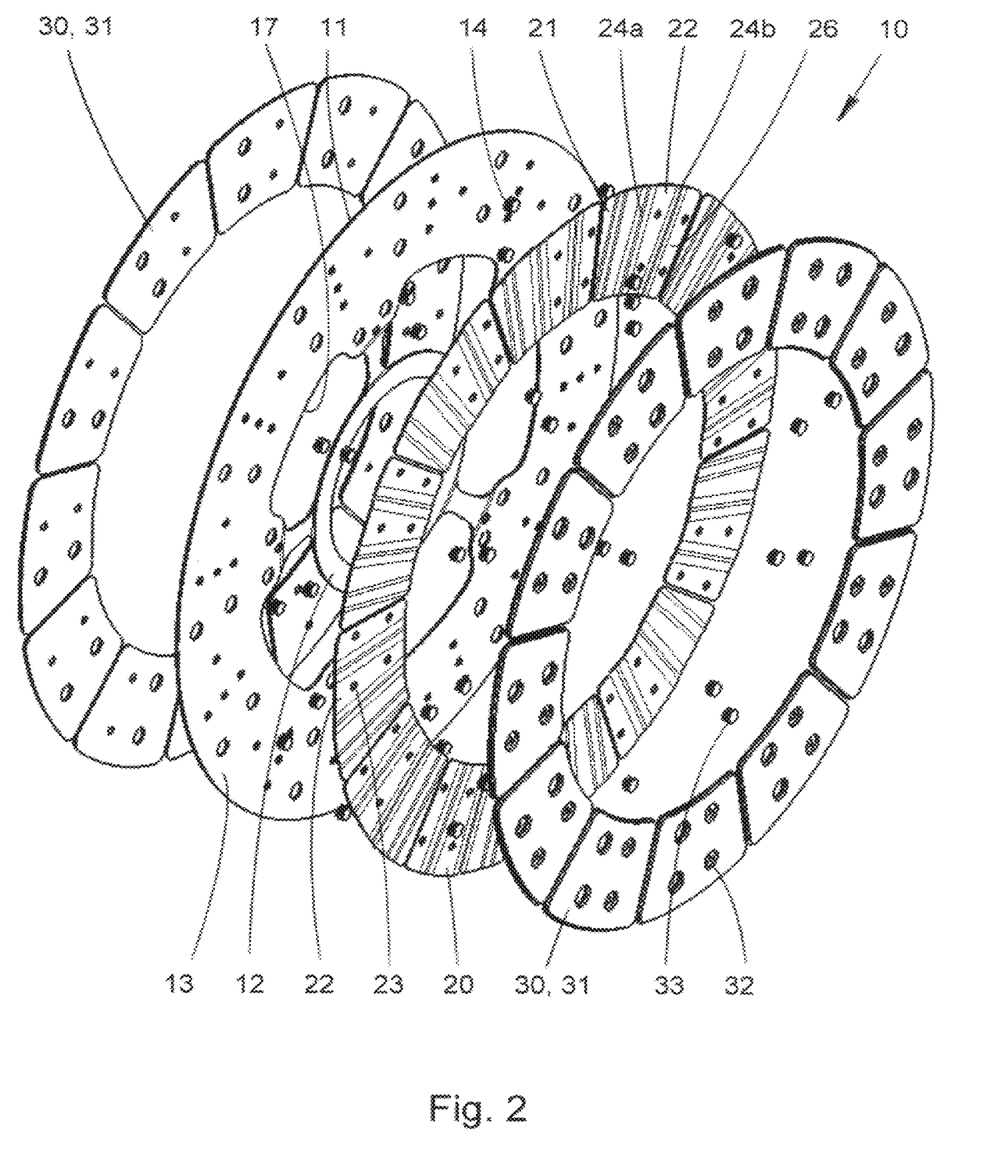
FIG. 2 is an exploded isometric view of the progressivity device according to the first embodiment of the invention of FIG. 1.

FIGS. 1 and 2 illustrate a first embodiment of a friction clutch disc 1 incorporating the progressivity device 10 according to the invention.

The friction clutch disc 1, having an axis of rotation X, comprises a vibration damping device 100 including, in a conventional manner, a torque transmission flange 2, guide elements 3 and helical compression springs 4. The coaxial parts 2 and 3 are mounted rotatably with respect to one another against the action of the helical compression springs 4. The friction clutch disc illustrates, in the present case, what is known as a "symmetrical" architecture and comprises a support flange 11 attached to the torque transmission flange 2. The support flange 11 is equipped with friction pads 30 distributed over the periphery of the torque transmission flange 2 about the axis X and able to rub against a pressure plate of a clutch mechanism. The two guide elements 3, also known as guide washers 3, are arranged on either side of the torque transmission flange 2, entrapping the helical compression springs 4 in intercalary housings.

A clutch mechanism fixed to the engine flywheel (not shown) applies a clamping force to the friction clutch disc 1 so as to transmit the torque produced by the engine in the direction of the gearbox.

The engine torque enters the friction clutch disc by way of the support flange 11 and exits by way of a central hub 5 arranged between the two guide washers 3. The central hub 5 is connected to the guide washers 3 by rivets 8. The central hub 5 is engaged with a pre-damper 7, in particular by way of a hub body 9. The hub body 9 is mounted on the driven shaft (not shown) of the gearbox and transmits the engine torque via splines formed on the inner bore thereof.

In a variant that is not shown, the friction clutch disc can have what is known as an "asymmetrical" architecture in which the support flange 11 is fixed directly to one of the guide washers 3.

As illustrated in FIGS. 1 and 2, the progressivity device 10 comprises, according to the first embodiment of the invention, a support flange 11, having a central axis of rotation X, borne by the torque transmission flange 2, progressivity blades 20 and friction pads 30 angularly distributed about the axis X.

The support flange 11 comprises an annular central part 12 designed to cooperate with the torsional vibration damper 100, and an external part 13 bearing the progressivity blades 20. The progressivity blades 20 are attached and extend circumferentially around the support flange 11. Each of the progressivity blades is fixed to the external part 13 of the support flange 11 by means of fixing rivets 14.

In the first embodiment of the invention, friction pads 30 are fixed directly to one of the faces of the support flange 11, and progressivity blades 20 are fixed to the other face of the support flange 11. The friction pads 30 of the two friction faces of the progressivity device 10 are arranged angularly opposite one another.

The fixing means 14 for the progressivity blades can be at least one rivet connecting the end of the progressivity blades 20 and the support flange 11, but could also be a welded or adhesively bonded connection.

The support flange 11 comprises openings 17 or notches which surround the helical compression springs 4. The openings 17 or the notches are formed in the central part 12. The support flange 11 is fixed to the torque transmission flange 2 by means of rivets (not shown) arranged angularly between the openings 17.

The friction pads 30 have an angular segment shape and completely cover the friction faces of the friction clutch disc 1. In this example, each of the friction faces is formed by twelve separate friction pads 30. To increase the durability of the clutch, the friction pad 30 is formed from metal-ceramic material. However, the friction pad could also be formed from frit, ceramic or from an organic material. The friction pad 30 is adhesively bonded onto an intercalary foil 31 for reasons of mechanical strength. The friction pad is, in this example, a subassembly formed from two separate layers of material, the intercalary foil 31 being generally produced from steel.

As illustrated in FIG. 2, the friction pads 30 designed to cooperate with the friction face of the pressure plate of the clutch mechanism are riveted to the progressivity blades 20.

The intercalary foil 31 and the friction pad 30 comprise holes 32 for the passage of assembly rivets 33 for assembling the pad on the progressivity blade 20.

Each of the progressivity blades comprises a support region 22 for the friction pad 30 that is offset axially with respect to the central part 12 of the support flange 11. The support region 22 is substantially planar and particularly comprises orifices 23 able to accommodate the assembly rivets 33.

In the embodiment illustrated in FIGS. 1 and 2, the progressivity blades 20 are secured and fixed to the support flange 11 at one of their ends 26 by means of a series of fixing rivets 14 aligned along an axis passing through the axis of rotation X. The fixing rivets 14 also secure the friction pads situated on the other friction face.

The progressivity blade 20 has a general circular arc shape with a rounded external profile coincident with the outside diameter of the support flange 11. The progressivity blade 20 also comprises one end 26 fixed to the external part 13 of the support flange 11, and a free end 21. The end 26 fixed to the support flange 11 is planar and rests on the external part 13.

In order to enlarge the friction face of the friction clutch disc 1, the friction pad 30 associated with the progressivity blade 20 covers the end 26 fixed to the support flange 11. The friction face is substantially continuous over 360°.

Folds 24a, 24b, which are materially integral with the progressivity blade 20, delimit the support region 22 arranged to receive the friction pad 30. The support region 22 for the friction pad 30 is offset axially with respect to the fixed end 26 of the progressivity blade.

Once the progressivity blades 20 have been riveted to the support flange 11, the support region 22 is elevated by the height of the folds 24a, 24b with respect to the plane of the support flange 11 formed by the external part 13. The overall stiffness of the progressivity device 10 is improved by virtue of the presence of a large number of folds.

According to one variant of the invention, the folds 24a, 24b can have the same width and the same height and extend symmetrically on either side of the diametral axis of the support flange. The two folds 24a, 24b form identical cambers. The folds are inclined by an angle of between 1° and 20° with respect to the plane perpendicular to the central axis X. The inclination of the folds provides an elevation of between 0.5 and 1.5 mm and preferably of 0.9 mm of the support region 22 with respect to the support flange 11.

Consequently, during the clutch re-engagement phase, when at least one of the friction faces is subjected to bearing stresses, the latter are transmitted to the support region 22 and to the folds 24a, 24b, which then deform in a controlled manner.

More precisely, the two folds are squashed in the same direction, in an identical and simultaneous manner on all the blades 20, in the manner of hinges, causing a tangential angular offset of the friction pads, the friction faces of which nevertheless remain in parallel planes, as illustrated in FIG. 1.

This selective deformation of the folds 24a, 24b of the support region 22 allows free pivoting of the friction pads 30 of the friction face oriented in the direction of the clutch mechanism about the axis of rotation X relative to the friction face oriented in the direction of the inertia flywheel. Thus, the friction pads remain in a plane perpendicular to the axis X.

Figure 3:
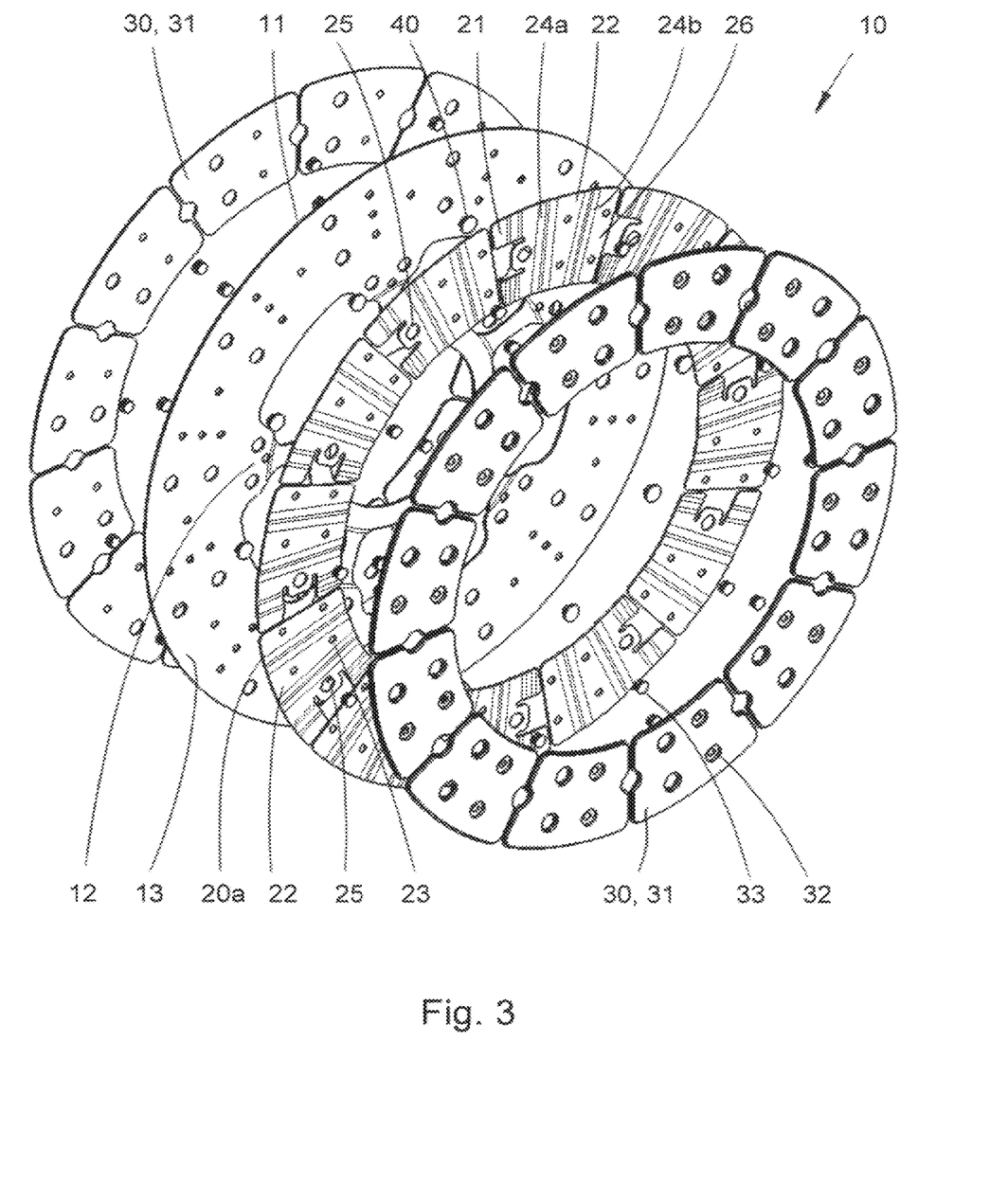
FIG. 3 is an exploded isometric view of a progressivity device according to a second embodiment of the invention.
Figure 4:
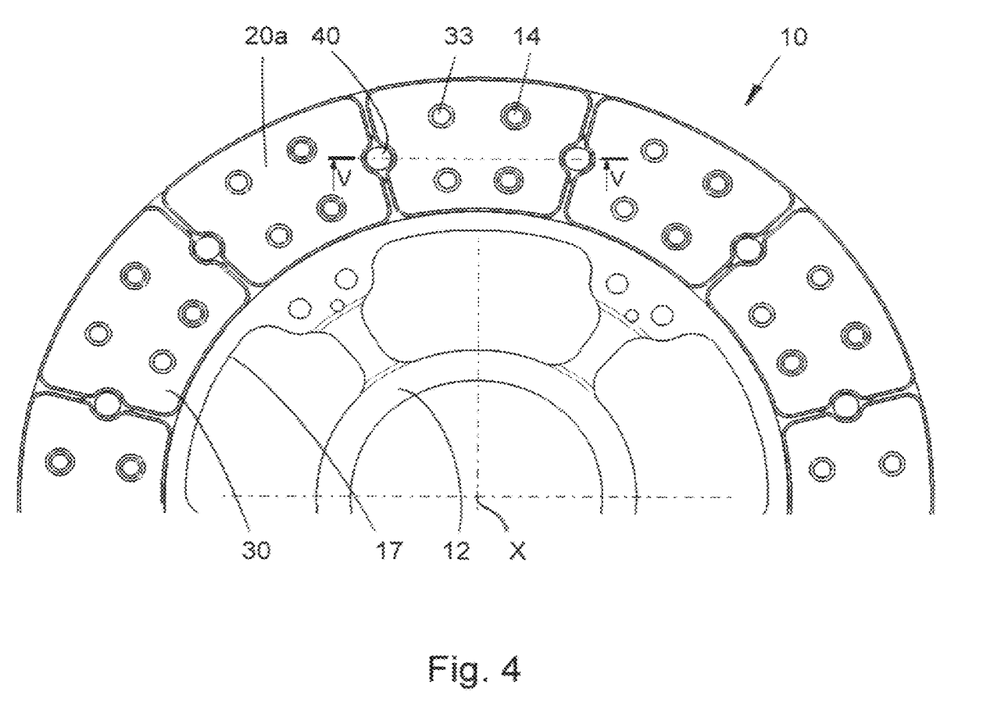
FIG. 4 is a front view of the progressivity device according to the second embodiment of the invention of FIG. 3.
Figure 5:
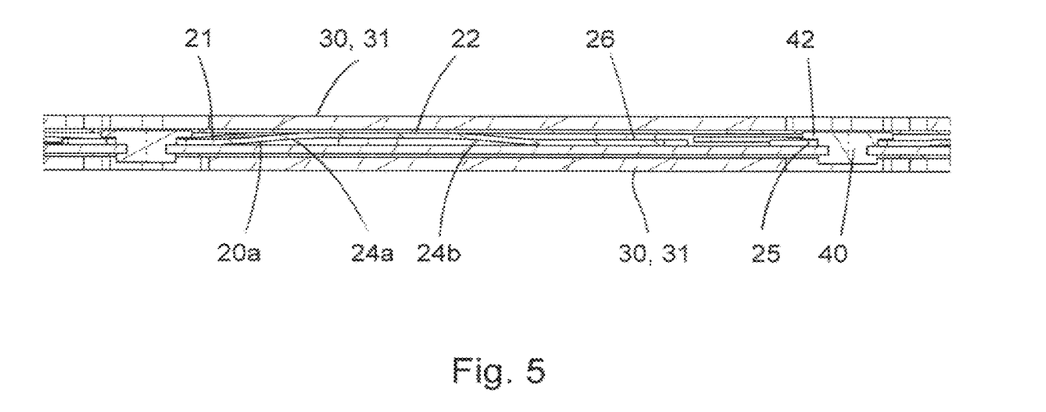
FIG. 5 is a partial sectional view of the progressivity device according to the second embodiment of the invention of FIG. 3.

A description will now be given, with reference to FIGS. 3, 4 and 5, of a friction clutch disc 1 incorporating the progressivity device 10 according to a second embodiment of the invention in which the support flange 11 comprises a retaining means 40 passing through the free end 21 of the progressivity blade 20a.

The retaining means 40 particularly comprises a rivet 40, having a shouldered head 42, fixed to the support flange 11 and introduced into an orifice 25 formed in the free end 21 of the progressivity blade 20a. When the progressivity device is freed from all axial compression force, part of the free end 21 bears on the shouldered head 42 of the rivet 40. The free end 21 of the progressivity blade 20a is retained axially with respect to the support flange 11 by way of the retaining means 40, thus reducing the geometric defects in the friction face of the pads.

According to this second embodiment of the invention, each end 21 of a progressivity blade 20a is traversed by a rivet 40. The rivets 40 are distributed angularly about the axis X and fixed to the external part 13 of the support flange 11.

The height of the shoulder of the rivet 40 is slightly greater than the thickness of the progressivity blade 20a so as to facilitate sliding of the latter during the clutch re-engagement phase.

The end 21 of the progressivity blade 20a can also comprise additional folded tabs having the aim of improving the overall stiffness of the progressivity device 10.

The orifice 25 formed at the end 21 of the progressivity blade 20a is circular and ensures a functional clearance between the rivet 40 and the progressivity blade 20a so as to facilitate sliding of the latter during the clutch re-engagement phase. In a variant, the orifice 25 can have an oblong shape.

According to a variant that is not shown, the retaining means 40 can comprise a folded tab materially integral with the support flange and introduced into an orifice formed in the free end of the progressivity blade, part of the free end being able to bear on the folded tab. The folded tabs are distributed angularly about the axis X and arranged on the external part 13 of the support flange 11.

Figure 6:
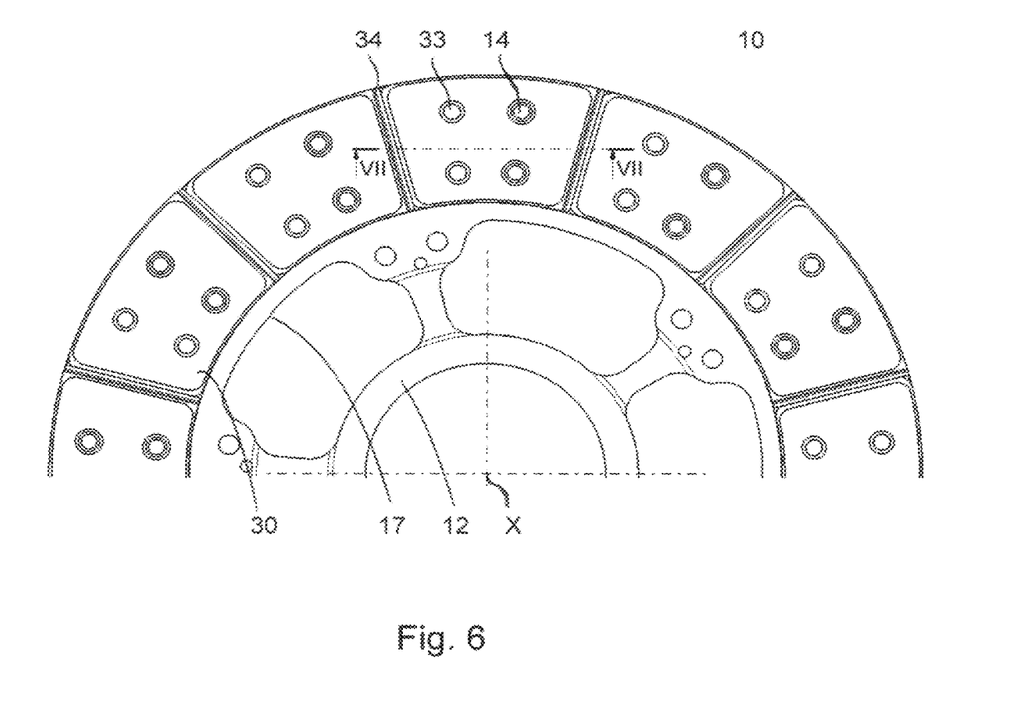
FIG. 6 is a front view of a progressivity device according to a third embodiment of the invention.
Figure 7:
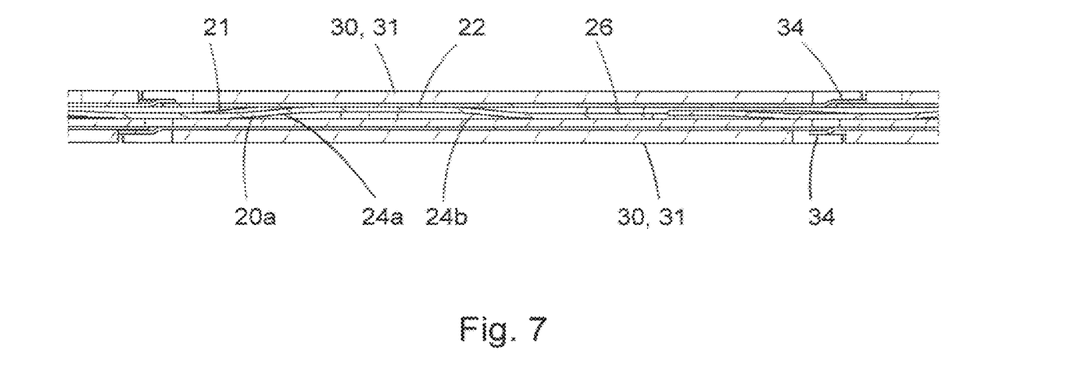
FIG. 7 is a sectional view of the progressivity device according to the third embodiment of the invention of FIG. 6.

A description will now be given, with reference to FIGS. 6 and 7, of a friction clutch disc 1 incorporating the progressivity device 10 according to a third embodiment of the invention in which each friction pad bears axially against the adjacent friction pad, in particular when the progressivity device is freed of all axial compression force.

In this third embodiment, each friction pad 30 is adhesively bonded onto an intercalary foil 31, and the intercalary foil 31 is arranged to bear axially on the intercalary foil of the adjacent friction pad when the progressivity device is freed from all axial compression force.

In particular, the intercalary foil 31 comprises a bearing tongue 34 oriented angularly in the direction of the free end 21 of the progressivity blade 20, and the bearing tongue 34 covers the intercalary foil 31 of the adjacent friction pad 30.

When the friction clutch disc is no longer subjected to the load of the clutch mechanism, the support region 22 of the progressivity blade 20 moves away axially with respect to the support flange. In the absence of retaining means, the progressivity blade 20 tends to deform in a disorderly manner, and the end of the friction pad 30 that is situated on the side of the free end 21 of the progressivity blade 20 rises axially more than the other end of the friction pad 30 that is situated on the side of the end 26 fixed to the support flange 11. The bearing tongue 34 oriented angularly in the direction of the free end 21 therefore axially retains the intercalary foil 31 of the adjacent friction pad 30, thus reducing the geometric defects in the friction face of the pads.

In relation to the second embodiment of the invention, this third embodiment has the advantage of simplifying the assembly of the progressivity device, given the absence of a rivet 40 having a shouldered head 42.

Figure 8:
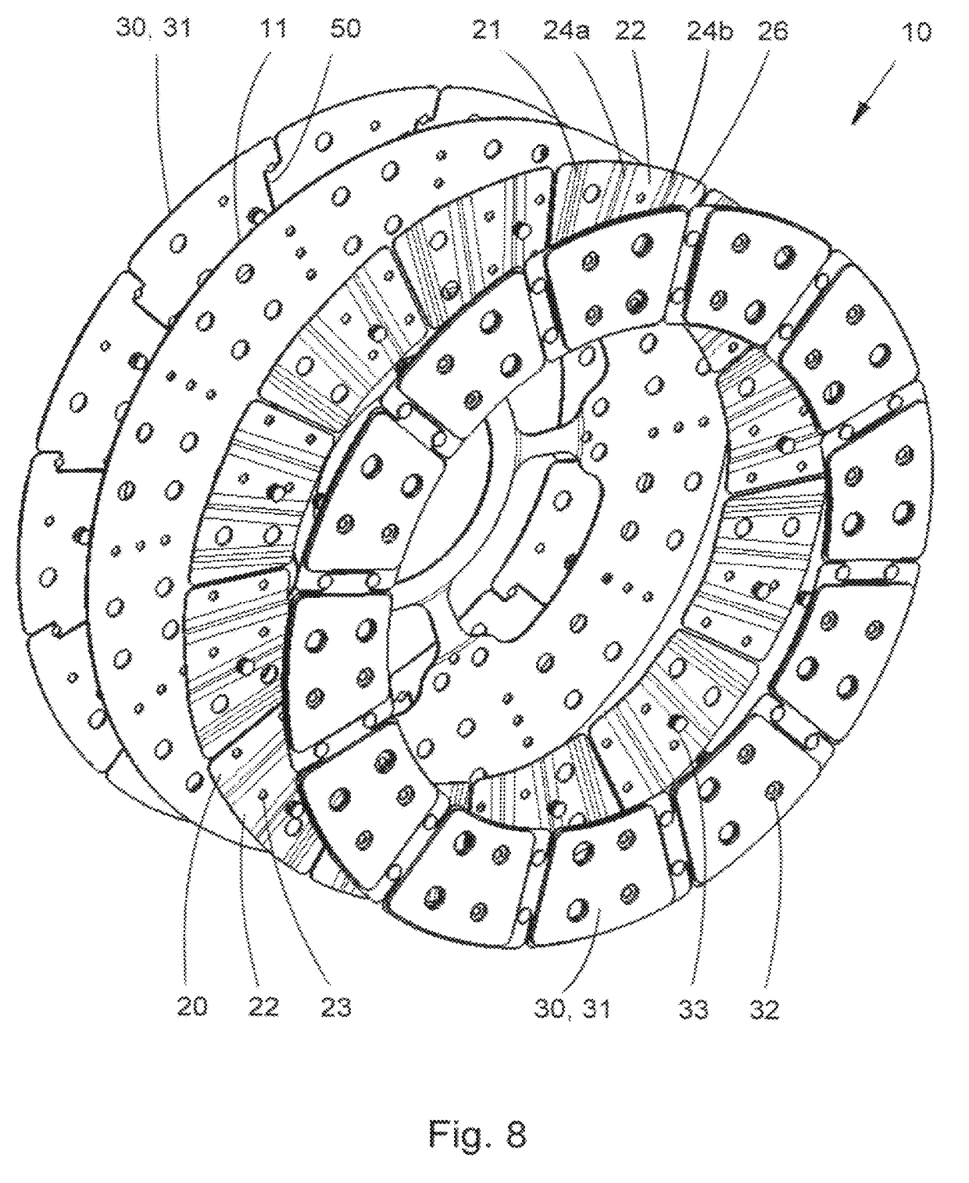
FIG. 8 is an exploded isometric view of a progressivity device according to a fourth embodiment of the invention.
Figure 9:
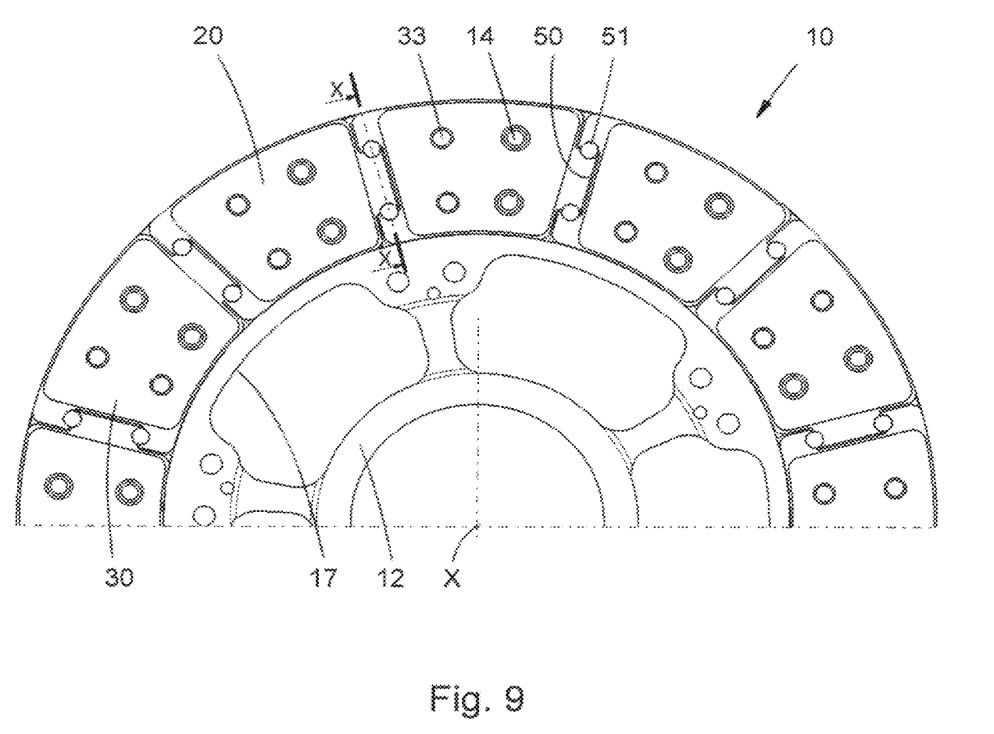
FIG. 9 is a front view of the progressivity device according to the fourth embodiment of the invention of FIG. 8.

A description will now be given, with reference to FIGS. 8, 9 and 10, of a friction clutch disc 1 incorporating the progressivity device 10 according to a fourth embodiment of the invention in which two circumferentially adjacent intercalary foils are connected to one another by a connection 50 of the "mortise and tenon" type.

The friction pad 30 has an angular segment shape. However, the associated intercalary foil 31 has an asymmetrical profile at the lateral faces. On one of the lateral faces, the intercalary foil has a protuberance forming the tenon and, on the other lateral face, the intercalary foil has a cavity forming the mortise.

The intercalary foils 31 of one and the same friction face can be inserted axially into one another and form a ring which is continuous over 360°. When the friction clutch disc 1 is subjected to a high speed of rotation, the friction pads 30 are securely held together by virtue of the mortise and tenon connections, thus limiting the deformation of the progressivity blades 20. The mortise and tenon connections 50 also have the advantage of creating a subassembly facilitating the assembly of the progressivity device 10.

In order to maintain the subassembly, the intercalary foils 31 bear axially on one another by way of additional rivets 51. In the present case, two additional rivets 51 are placed at each mortise and tenon connection 50. In this way, the friction pads are maintained axially in one and the same plane when the progressivity device is freed from all axial compression force. Cutouts 52 are formed in the support flange to allow the passage of the additional rivets 51 when the progressivity device is compressed.

In this fourth embodiment, the two folds 24a, 24b of the progressivity blade 20 extend in an orthoradial direction with respect to the diametral axis X of the support flange 11 such that, under bearing stresses, the folds are squashed in an isostatic manner. The orthoradial direction can be defined as being orthogonal to the axis of rotation X and, in particular, perpendicular to the radius for installing the blades 20 on the support flange 11.

The progressivity blades are produced from steel sheet, the folds 24a, 24b being perpendicular to the rolling direction of the sheet. Preferably, the folds of one and the same blade are parallel to one another. The two folds 24a, 24b form identical cambers. The folds are inclined by an angle of between 1° and 20° with respect to the plane perpendicular to the central axis X. The inclination of the folds provides an elevation of between 0.5 and 1.5 mm and preferably of 0.9 mm of the support region 22 with respect to the support flange 11.

Consequently, during the clutch re-engagement phase, when at least one of the friction faces is subjected to bearing stresses, the latter are transmitted to the support region 22 and to the folds 24a, 24b, which then deform in a controlled manner.

Figure 10:
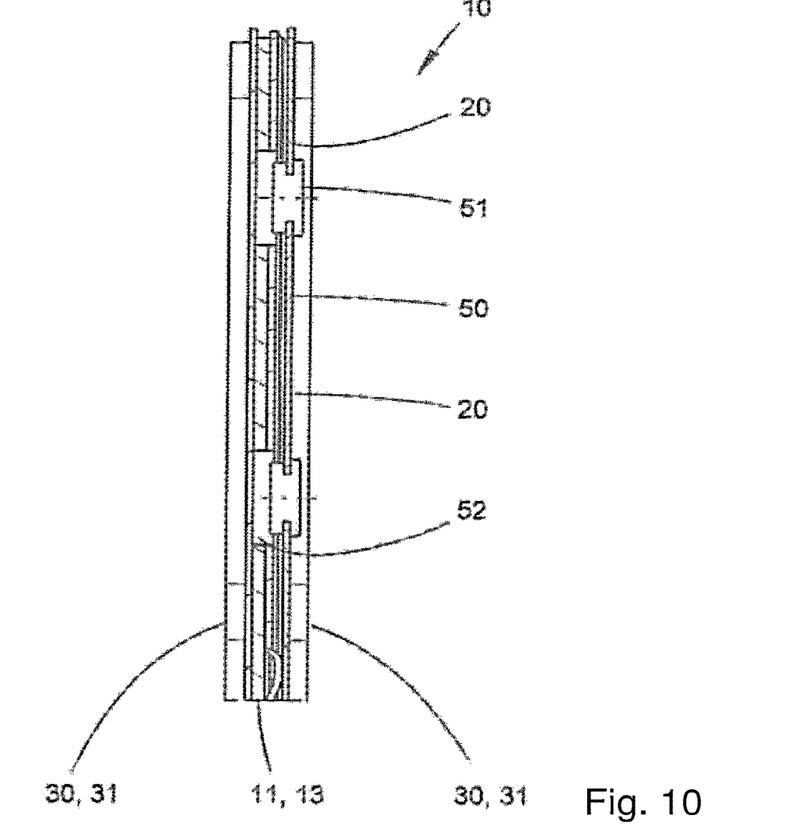
FIG. 10 is a sectional view of the progressivity device according to the fourth embodiment of the invention of FIG. 8.

More precisely, the two folds are squashed in the same direction, in an identical and simultaneous manner on all the progressivity blades 20, in the manner of hinges, causing a tangential angular offset of the friction pads, the friction faces of which nevertheless remain in parallel planes, as illustrated in FIG. 10.

Figure 11:
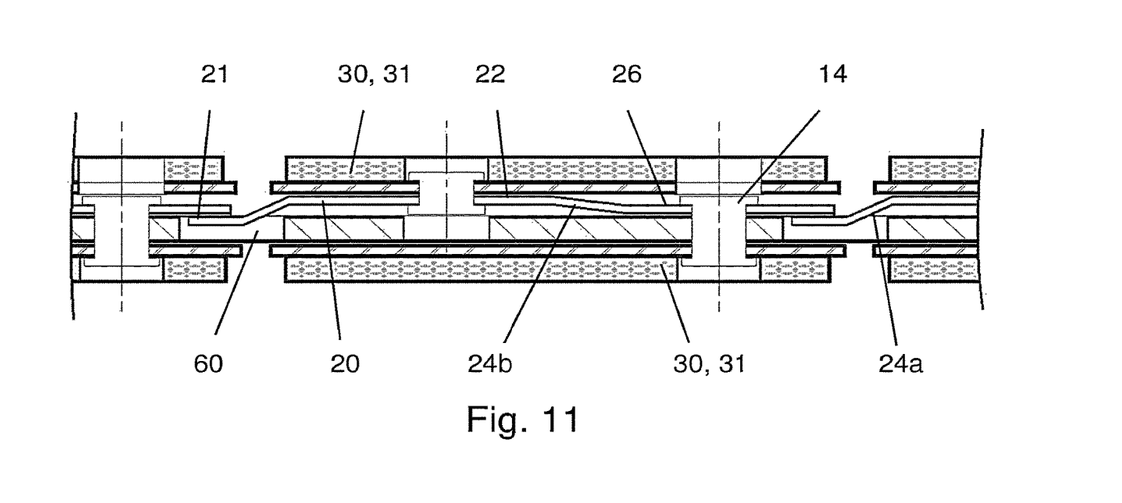
FIG. 11 is a sectional view of a progressivity device according to a fifth embodiment of the invention.

A description will now be given, with reference to FIG. 11, of a friction clutch disc 1 incorporating the progressivity device 10 according to a fifth embodiment of the invention in which the free end 21 of each progressivity blade 20 is retained at least partially axially with respect to the support flange 11 by way of the fixed end 26 of the adjacent progressivity blade when the progressivity device is freed from all axial compression force.

Part of the free end 21 of each progressivity blade is inserted into a disengagement hole 60 formed in the support flange 11 and covered at least partially by the fixed end 26 of the adjacent progressivity blade, thus contributing to reducing the axial bulk of the progressivity device.

The progressivity blade 20 comprises two material folds 24a, 24b delimiting the support region 22 for the friction pad. The material fold 24b situated between the fixed end 26 and the support region 22 for the friction pad extends along a substantially radial direction, the other material folds 24a of the progressivity blade being distributed circumferentially beyond the support region 22 and away from the fixed end 26. Producing the folding in this way is common to all the embodiments presented in FIGS. 1 to 11.

The invention is not limited to the exemplary embodiments that have just been described. Thus, for example, only progressivity blades can extend circumferentially over the two faces of the support flange, the progressivity blades being arranged axially facing one another, on either side of the external part of the support flange.

The invention claimed is:

1. A progressivity device for a friction clutch disc, comprising:
   a support flange, having a central axis of rotation, in which an annular central part is configured to cooperate with a torsional vibration damper, and an external part carries progressivity blades and friction pads attached to the progressivity blades, wherein the friction pads are attached to and directly abut a first side of the progressivity blades,
   wherein the progressivity blades extend circumferentially over at least one of the faces of the support flange,
   wherein each of the progressivity blades comprises one end fixed to the external part, another free end and folds delimiting a support region for the friction pad, the friction pad associated with the progressivity blade covering the end fixed to the support flange, and
   wherein the free end of each of the progressivity blades is retained at least partially axially with respect to the support flange by the fixed end of the adjacent progressivity blade when the progressivity device is freed from all axial compression force.

2. The progressivity device according to claim 1, wherein the support region of each of the progressivity blades is offset axially with respect to the fixed end, the fixed end of said progressivity blade bearing on the face of the support flange.

3. The progressivity device according to claim 1, wherein each of the friction pads bears axially against a circumferentially adjacent friction pad.

4. The progressivity device according to claim 3, wherein each of the friction pads comprises an intercalary foil, two circumferentially adjacent intercalary foils being connected to one another by a mortise and tenon connection and bearing axially on one another by at least one additional rivet.

5. The progressivity device according to claim 1, wherein each of the friction pads comprises an intercalary foil, the intercalary foil bearing axially on the intercalary foil of the adjacent friction pad when the progressivity device is freed from all axial compression force.

6. The progressivity device according to claim 5, wherein the intercalary foil comprises a bearing tongue oriented angularly in the direction of the free end of each of the progressivity blades, said bearing tongue bearing directly on the intercalary foil of the adjacent friction pad.

7. The progressivity device according to claim 1, wherein part of the free end of each of the progressivity blades is inserted into a disengagement hole formed in the support flange and covered at least partially by the fixed end of the adjacent progressivity blade.

8. The progressivity device according to claim 1, wherein each of the progressivity blades comprises at least two material folds delimiting the support region for the friction pad, the material fold situated between the fixed end and the support region for the friction pad extending along a substantially radial direction, the other material folds of the progressivity blade being distributed circumferentially beyond the support region and away from the fixed end.

9. The progressivity device according to claim 1, wherein the friction pads are fixed directly to one of the faces of the support flange, opposite the progressivity blades arranged on the other face.

10. The progressivity device according to claim 1, wherein the progressivity blades extend circumferentially over the two faces of the support flange, the progressivity blades being arranged axially facing one another, on either side of the external part.

11. A friction clutch disc for a motor vehicle, comprising:
a torque transmission flange;
two guide washers arranged on either side of said torque transmission flange;
helical compression springs bearing on the torque transmission flange and the guide washers; and
the progressivity device according to claim 1,
wherein the support flange is borne by the torque transmission flange or by one of the two guide washers.

12. A progressivity device for a friction clutch disc, comprising:
a support flange, having a central axis of rotation, in which an annular central part is configured to cooperate with a torsional vibration damper, and an external part carries progressivity blades and friction pads attached to the progressivity blades, each friction face of the progressivity device comprises separate friction pads having an angular segment shape,
wherein the progressivity blades extend circumferentially over at least one of the faces of the support flange,
wherein each of the progressivity blades comprises one end fixed to the external part, another free end and folds delimiting a support region for the friction pad, the friction pad associated with the progressivity blade covering the end fixed to the support flange, and
wherein each of the friction pads comprises an intercalary foil, the intercalary foil bearing axially on the intercalary foil of the adjacent friction pad when the progressivity device is freed from all axial compression force.

13. The progressivity device according to claim 12, wherein the support flange comprises a retaining means passing through the free end of each of the progressivity blades.

14. The progressivity device according to claim 13, wherein the free end of each of the progressivity blades is retained axially with respect to the support flange by the retaining means when the progressivity device is freed from all axial compression force.

15. The progressivity device according to claim 13, wherein the retaining means comprises a rivet, having a shouldered head, fixed to the support flange and introduced into an orifice formed in the free end of each of the progressivity blades, part of the free end being configured to bear on the shouldered head of the rivet.

16. A progressivity device for a friction clutch disc, comprising:
a support flange, having a central axis of rotation, in which an annular central part is configured to cooperate with a torsional vibration damper, and an external part carries progressivity blades and friction pads attached to the progressivity blades, each friction face of the progressivity device comprises separate friction pads having an angular segment shape,
wherein the progressivity blades extend circumferentially over at least one of the faces of the support flange,
wherein each of the progressivity blades comprises one end fixed to the external part, another free end and folds delimiting a support region for the friction pad, the friction pad associated with the progressivity blade covering the end fixed to the support flange, and
wherein the progressivity blades extend circumferentially over the two faces of the support flange, the progressivity blades being arranged axially facing one another, on either side of the external part.

* * * * *